US006832124B2

United States Patent
Engstrand et al.

(10) Patent No.: US 6,832,124 B2
(45) Date of Patent: Dec. 14, 2004

(54) METHOD AND AN ARRANGEMENT RELATING TO OPTICAL FIBERS

(75) Inventors: Jan-Åke Engstrand, Trångsund (SE); Magnus Larsson, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 572 days.

(21) Appl. No.: 09/884,988

(22) Filed: Jun. 21, 2001

(65) Prior Publication Data

US 2002/0021870 A1 Feb. 21, 2002

(30) Foreign Application Priority Data

Jun. 22, 2000 (SE) .............................................. 0002398

(51) Int. Cl.[7] .............................................. G06F 19/00
(52) U.S. Cl. ..................... 700/117; 700/118; 65/378; 385/92
(58) Field of Search ................................ 700/117, 118; 65/378; 385/92

(56) References Cited

U.S. PATENT DOCUMENTS

| | | | | |
|---|---|---|---|---|
| 4,017,013 A | * | 4/1977 | Hawk et al. | ................ 225/96.5 |
| 4,039,309 A | * | 8/1977 | Albanese et al. | ............. 65/433 |
| 4,679,908 A | * | 7/1987 | Goodwin | ..................... 385/91 |
| 5,318,610 A | * | 6/1994 | Takimoto et al. | ............. 65/411 |
| 5,707,684 A | * | 1/1998 | Hayes et al. | ................ 427/162 |
| 5,770,001 A | * | 6/1998 | Nagayama et al. | ......... 156/350 |
| 2001/0045108 A1 | * | 11/2001 | Steinberg et al. | ............. 65/378 |
| 2002/0021870 A1 | * | 2/2002 | Engstrand et al. | ............ 385/76 |
| 2003/0068142 A1 | * | 4/2003 | Brezina et al. | ............... 385/92 |

FOREIGN PATENT DOCUMENTS

| | | | | |
|---|---|---|---|---|
| JP | 2205808 | * | 8/1990 | ............ G02B/6/32 |
| JP | 2188707 A | | 10/1990 | |
| JP | 2205808 A | | 10/1999 | |

* cited by examiner

*Primary Examiner*—Leo Picard
*Assistant Examiner*—Michael D. Masinick
(74) *Attorney, Agent, or Firm*—Burns, Doane, Swecker & Mathis, L.L.P.

(57) ABSTRACT

The invention relates to an arrangement for and a method of shaping an end face 230 of an optical fiber 26. The end face 230 is heated by a heat source 204, 206 in order to form a substantially hemispherical end face 230, which functions as a lens and has a predetermined radius value. An actual radius value of the end face is repetitively calculated by a control computer 6 using information from an image processing device 4, which computer 6 then compares the actual radius value with the predetermined radius value. The heating of the end face is continued if the actual radius value is lower than the predetermined radius value, and discontinued if the actual radius value is equal to or higher than the predetermined radius value.

11 Claims, 6 Drawing Sheets

METHOD AND AN ARRANGEMENT RELATING TO OPTICAL FIBERS

TECHNICAL FIELD OF THE INVENTION

The invention relates to a method of and an arrangement for shaping an end face of an optical fiber, comprising heating the end face to form a substantially hemispherical end face having a predetermined radius value.

DESCRIPTION OF RELATED ART

Tapered optical fibers, i.e. optical fibers with substantially hemispherical end faces, are normally used in the microoptoelectronic industry to couple light from a laser chip to an optical fiber. The substantially hemispherical end face of the tapered fiber functions as a lens and focuses the light from the laser chip into the fiber core to provide an improved connection, i.e. increased coupling, for the light travelling between the laser chip and the fiber. Tapered optical fibers are also used when providing an improved connection for light travelling from an optical fiber to a light-receiving device.

Today, one way of making tapered optical fibers is to grind the end face of the optical fiber into a hemispherical shape that makes the end face function as a lens. This is both difficult and expensive.

Another way of making tapered optical fibers is to use a tapering device. Tapering devices of this kind use heat and a pulling force to form the end face of an optical fiber into a hemispherical shape that makes the end face function as a lens. Today, the taper forming sequence in tapering devices of this kind is controlled manually by an operator. The operator sets a predefined heating time, turns on a plasma flame and after the preset time, the plasma flame is automatically turned off. Thereafter, if the operator feels that the end face of the fiber differs too much from a desired shape, he turns on the plasma flame again, lets it burn as long as he thinks is needed, and turns it off. He repeats this until he is satisfied with the result.

The conventional method of using heat and a pulling force to taper a fiber as described above has the following disadvantages: In the first place, the operator is unable to accurately estimate when to turn off the plasma flame, especially as it is slightly unstable and thus does not emit the same amount of heat energy at all times. Secondly, metal particles are bonded into the optical fiber every time the plasma flame is ignited, making the glass in the optical fiber weaker which may cause the fiber, including the fiber core, to bend downwards due to gravity if the fiber is in a horizontal position during the end face shaping process, Thirdly, the tapered fibers approved by the operator may have varying shapes on the end faces of the fibers depending on which one of several operators is operating the tapering device.

SUMMARY OF THE INVENTION

The object of the invention is to bring about a method and an arrangement relating to shaping of an end face of an optical fiber, comprising heating the end face to form a substantially hemispherical end face having a predetermined radius value without having to execute repetitive steps of turning on a heat source.

This is achieved by the use of a method of shaping an end face of an optical fiber comprising the steps of calculating an actual radius value of the end face, comparing the actual radius value with the predetermined radius value, continuing heating of the end face if the actual radius value is lower than the pre determined radius value, and discontinuing the heating of the end face if the actual radius value is equal to or higher than the predetermined radius value.

The heating is done by producing heat energy using a heat source such as for example a plasma generator or a laser.

The method and arrangement according to the invention has the following advantages: It is possible to acquire the same shape repeatedly on the end faces of different optical fibers, regardless of which one of several operators is operating the end face shaping device. Bonding of metal particles into the optical fiber is minimized, whereby weakening of the glass in the optical fiber is avoided. Further, the yield will be Loved and thus less rework will be needed which means that the overall production cost will decrease considerably. It is also possible to adapt the fiber end radius to different optical modules.

BRIEF DESCRIPTION OF THE DRAWINGS

The invention will be described in more detail below with reference to he appended drawings, wherein.

DETAILED DESCRIPTION OF EMBODIMENTS

Figure 1:
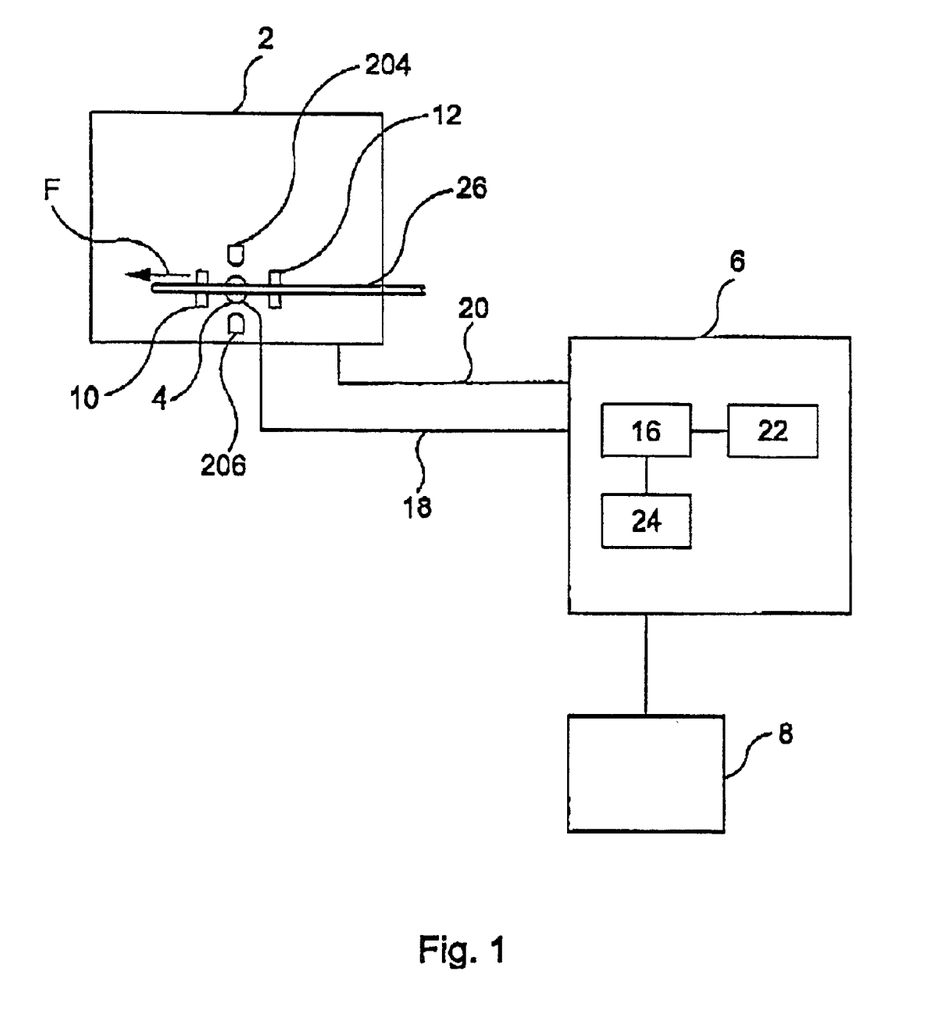
FIG. 1 shows a schematic block diagram of the inventive end face shaping arrangement.

On the drawings, FIG. 1 shows a schematic block diagram of the inventive end face shaping arrangement, which comprises an end face shaping device 2, an image processing device 4 connected to the end face shaping device 2, a control computer 6 connected to the image processing device 4 and to the end face shaping device 2, and a display 8 connected to the control computer 6.

The end face shaping device 2 comprises gripping devices 10, 12 for gripping an optical fiber 26, and a heat source 204, 206 for heating of the optical fiber 26.

The control computer 6 comprises a CPU (central processing unit) 16 for processing of information received from the image processing device 4 via a first connection 18 and for sending control information to the end face shaping device 2 via a second connection 20. The control computer further comprises a RAM (random access memory) 22 for storing of a predetermined radius value and a ROM (read only memory) 24 containing a control program.

A means (not shown) is provided to apply a pulling force F to the gripping device 10.

Figure 2:
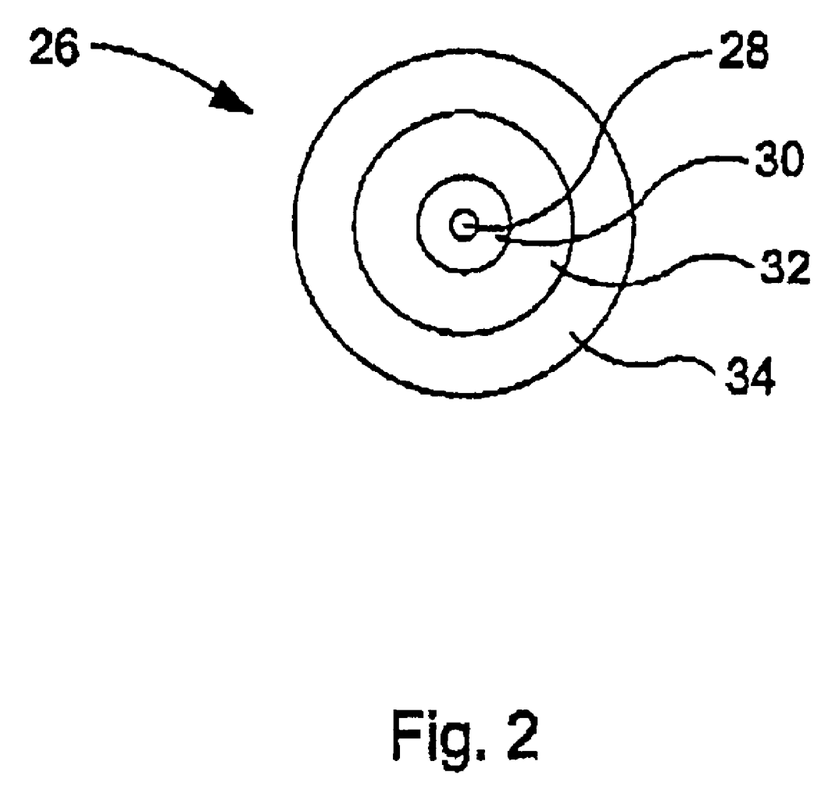
FIG. 2 shows schematically an optical fiber in cross sectional view.

FIG. 2 shows schematically the optical fiber 26, in cross sectional view. The optical fiber 26 comprises a core 28, a cladding 30 and a coating, which coating may include one, two or more layers, for example a inner coating 32 and an outer coating 34.

The end face shaping method according to one embodiment of the invention, comprises a preparation step, an end face shaping sequence, and a finishing step. It is possible to use several types of image processing devices 4, such as for example a CCD-camera (charged coupled device camera) or a C-MOS camera. The image processing device in this embodiment is a CCD-camera 4.

The Preparation Step

The coating, inner 32 and outer 34 layers, is removed from the part of the optical fiber 26 to be placed between the first 10 and the second 12 gripping device, whereby only the core 28 and clad 30 remains (see FIGS. 1 and 2).

The optical fiber 26 is placed horizontally or at an angle to the horizontal plane, including vertically, in the end face shaping device 2 between the first 10 and the second 12 gripping device (see FIG. 1).

The optical fiber 26 is grabbed and fixed by the first 10 and second 12 gripping devices in the end face shaping device 2.

A desired end face radius value is set. As heat effects a picture taken by a CCD-camera, the desired end face radius value must be modified before entered into the end face shaping arrangement. This heat-influence-compensated end face radius value is called the predetermined end face radius value.

The predetermined end face radius value is set. The value may vary depending on what laser chip (not shown) the optical fiber 26 is intended for.

End Face Shaping Sequence

FIGS. 3a–3g show some steps in an end face shaping sequence, where heat energy, for example introduced by using a plasma flame or a laser beam, is produced by a heat source, for example plasma generators 204, 206 or lasers, and directed towards the part of the fiber that is placed between the two gripping devices. In this embodiment plasma generators 204, 206 are used as the heat source (see FIG. 3a).

The heat source is turned on and, simultaneously, the pulling force F (FIG. 1) is applied to the first gripping device 10, thus creating a pulling force in the optical fiber 26. At the same time, a vision system begins to check if the optical fiber 26 has broken into two parts, by using the CCD-camera 4, which registers patterns of light and dark arm around the part of the optical fiber 26 which is situated in the plasma flame (see FIG. 1).

Figure 3A:
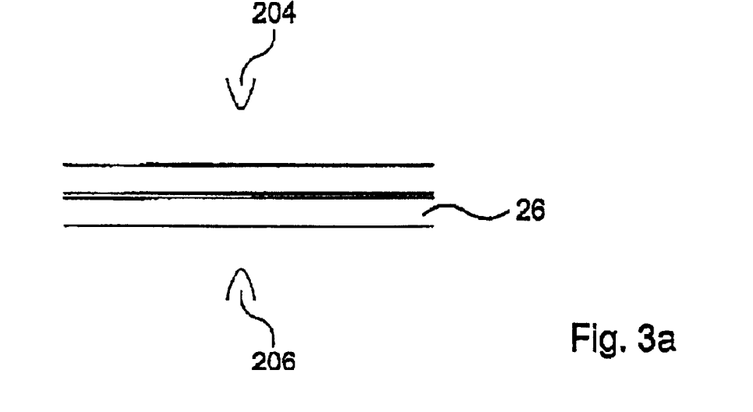
FIGS. 3a–3g show schematically some steps of the inventive end face shaping method.
Figure 3B:
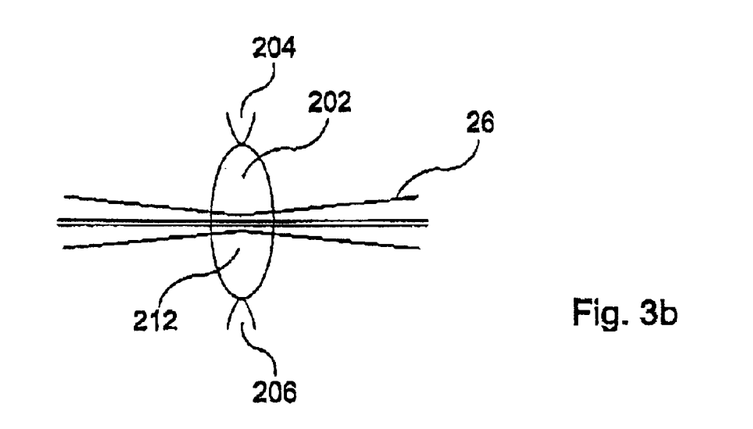
Figure 3C:
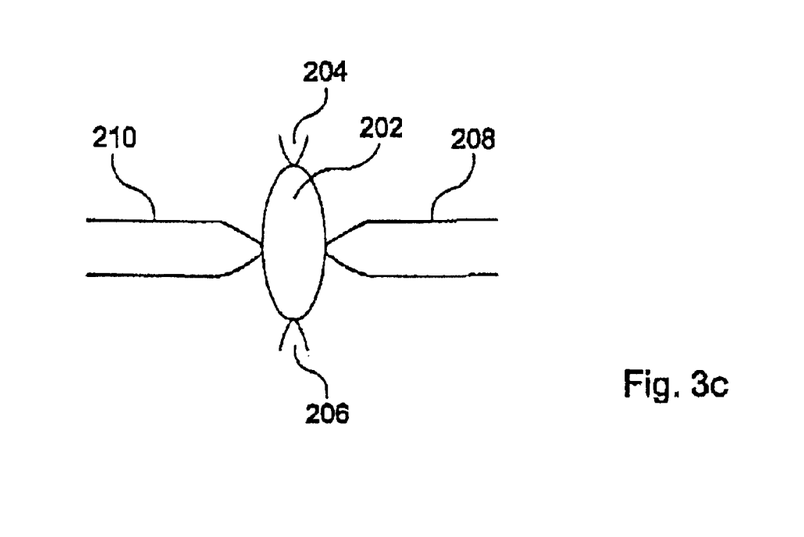
Figure 3D:
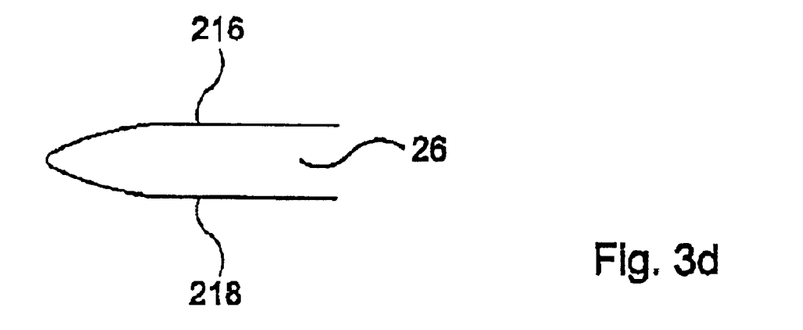

The heat from the plasma flame 202 in combination with the pulling force makes the fiber 26 to begin to be pulled apart, thus forming a waist 212 in the optical fiber 26 (see FIG. 3b).

When the optical fiber breaks into two parts 208, 210 held by the first and second gripping devices, the first gripping device and the part of the optical fiber 210 held by it is moved away from the second gripping device due to the pulling force on the first gripping device. The second part of the fiber 208, now having a pointed shape due to the waist formed on the fiber is kept in the plasma flame 202 by the second gripping device, whereby the heat from the plasma flame 202 begins forming the end face of he optical fiber into a hemispherical shape (see FIG. 3c).

The CCD-camera registers the breaking of the optical fiber by registering patterns of light and dark areas around the part of the optical fiber 26 which is situated in the plasma flame. This breaking is registered by the control computer. The control computer begins searching for two diametrically opposed points on the cylindrical fiber end part, which is held by the second gripping device. Said points are appearing as edge points 216, 218 when the CCD-camera is registering patterns of light and dark areas around the optical fiber 26 (see FIG. 3d).

Figure 3E:
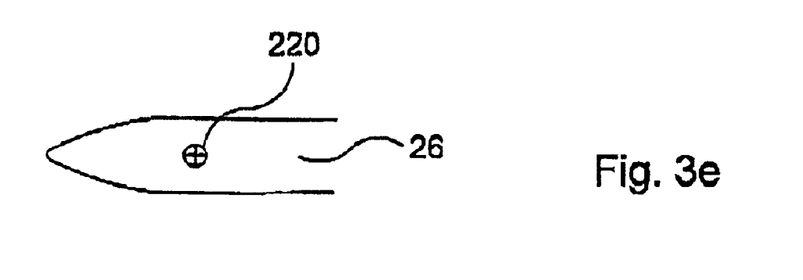

When these edge points 216, 218 are found, the control computer begins to calculate a center point 220 between the two edge points in the optical fiber 26 using the position of the edge points (see FIG. 3e).

Figure 3F:
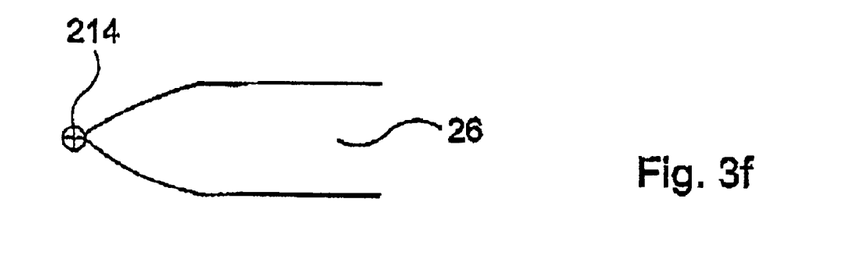

When this center point 220 has been found, the control computer calculates the position of the optical fiber end face tip 214 using the calculated position of the center point and the CCD-camera registering patterns of light and dark areas around the optical fiber 26 (see FIG. 3f).

Figure 3G:
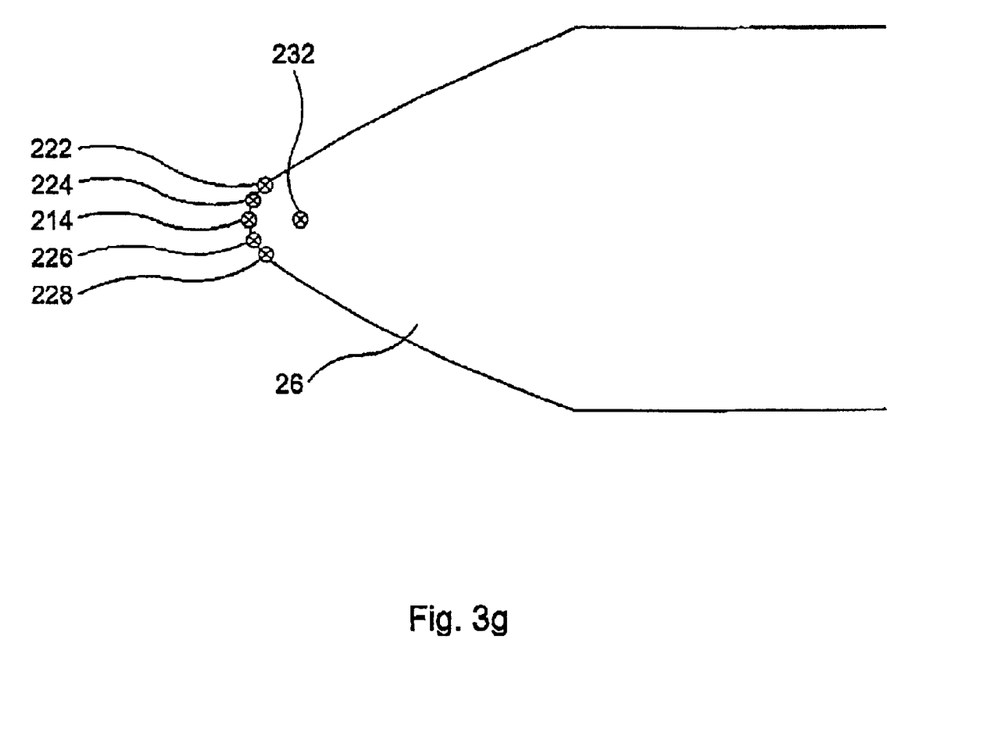

When this end face tip 214 has been found a number of measuring points 222, 224, 226, 228 are visually located on the part of the surface of the optical fiber end face near the end face tip 214 by using the calculated position of the end face tip 214 and the CCD-camera registering patterns of light and dark areas around the optical fiber 26 (see FIG. 3g).

An imaginary circle (not shown) with a circumference passing through these points, including the end face tip 214, is created using a best fit calculation method, for example by minimizing the total distance between the points 214, 222, 224, 226, 228 and the circumference of the imaginary circle. Other methods, such as creating a maximal and a minimal imaginary circle using the outmost and inmost points, respectively, and thereafter creating a circle having a radius value that is the mean value of the radius values of the two circles, are also possible to use.

After the creation of the imaginary circle, the position of the center 232 of the imaginary circle is calculated using the control computer. The radius value of this imaginary circle is calculated by the control computer, thus calculating an actual radius value of the end face as the calculated radius value is used as the actual radius value.

Thereafter, as the actual radius value is small when the optical fiber breaks in two parts and increases when heating the end face of the optical fiber, the actual radius value is compared with the predetermined radius value, whereby the heating of the end face is continued if the actual radius value is lower than the predetermined radius value. If the actual radius value is lower than the predetermined radius value, the calculation of the actual radius value is repeated, whereafter a new comparison between the actual radius value and the predetermined radius value is made. This is done until the actual radius value is equal to or higher than the predetermined radius values If the actual radius value is equal to or higher than the predetermined radius value, the heating of the end face is discontinued.

Figure 4:
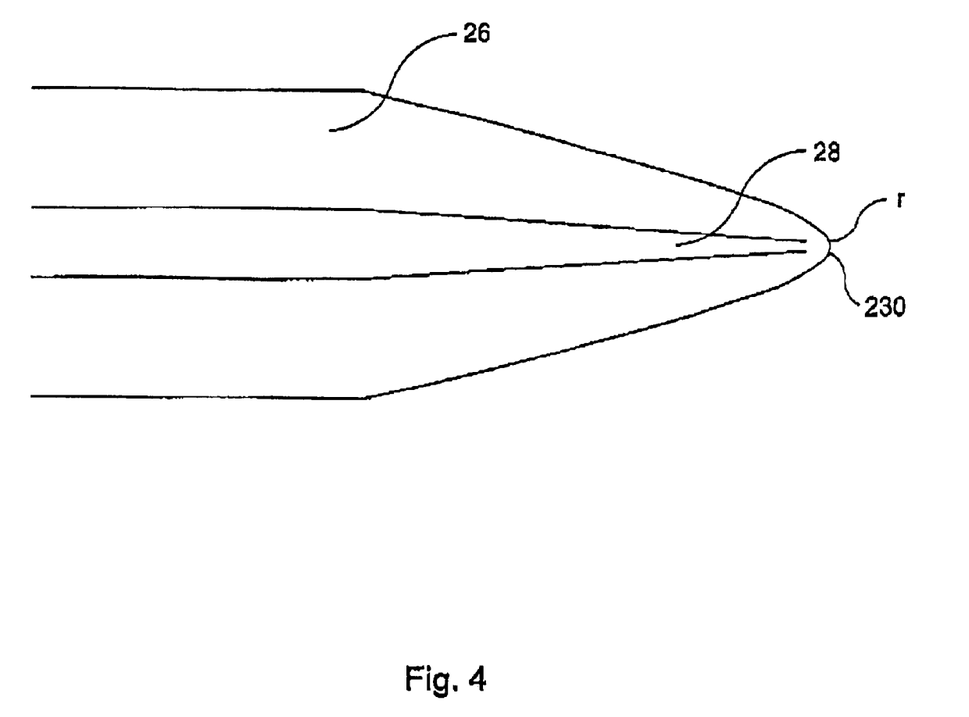
FIG. 4 shows schematically a tapered end face of an optical fiber.

As can be seen in FIG. 4, the result of this tapering process is that a hemispherical fiber end face 230 has been formed on a fiber 26, which hemispherical fiber end face 230 functions as a lens.

The arrangement for shaping the end face 230 of the optical fiber 26 comprises means for heating the end face to form a substantially hemispherical end face 230 having a predetermined radius value. Said arrangement also comprises means 6 for repetitively calculating the actual radius value of the end face, means 6 for comparing the actual radius value with the predetermined radius value, means 204, 206 for continuing heating of the end face if the actual radius value is lower than the predetermined radius value, and means (not shown) for discontinuing the heating of the end face if the actual radius value is equal to or higher than the predetermined radius value.

The means 6 for calculating the actual radius value of the end face comprises: means 4 for visually locating a number of points on the surface of the end face of the optical fiber 26, means 6 for creating the imaginary circle with a circumference passing through these points using a best fit calculation method, means 6 for calculating the radius value of this circle, and means 6 for setting the actual radius value equal to this calculated radius value.

The computer program for use in the end face shaping arrangement for optical fibers 26 comprises, in order form a substantially hemispherical end face 230 having a predetermined radius value, computer readable code means, which when run on a computer 6, causes the end face shaping arrangement to heat the end face 230. Said computer program also comprises computer readable code means, which when run on a computer 6, causes the end face shaping arrangement to repetitively calculate an actual radius value of the end face, and computer readable code means, which when run on a computer 6, causes the end face shaping arrangement to compare the actual radius value with the predetermined radius value. Said computer program comprises fiber computer readable code means, which when run on a computer 6, causes the end face shaping arrangement to continue heating of the end face if the actual radius value is lower than the predetermined radius value, and computer readable code means, which when run on a computer 6, causes the end face shaping arrangement to discontinue the heating of the end face if the actual radius value is equal to or higher than the predetermined radius value.

A computer program product for use in connection with the invention comprises a computer readable medium, which may comprise a memory chip or a diskette, and the computer program mentioned above, said computer program being recorded on said computer readable medium.

Finishing Step

As heat affects the picture taken by the CCD-camera, the previously mentioned calculated actual radius value differs from the real radius value r of the end face of the optical fiber 26. Therefore, a renewed calculation of the fiber end face radius value is made with the heat source tuned off, whereby the real radius value r is acquired. This value is compared with the desired end face radius value. If they do not correspond to each other, within predetermined limits, the end face 230 of the optical fiber 26 is rejected and cut off. If they substantially correspond to each other, within predetermined limits, the end face 230 of the optical fiber 26 is accepted. The parts of the fiber held by the first and second gripping devices 10, 12 are removed from the tapering device 2. After this, a new optical fiber 26 is inserted in the tapering device 2 and the process may be started again (see FIGS. 1 and 4).

What is claimed is:

1. A method of shaping an end face of an optical fiber, using a control computer, comprising heating the end face to form a substantially hemispherical end face having a predetermined radius value, comprising the steps of:
   repetitively calculating an actual radius value of the end face;
   comparing the actual radius value with the predetermined radius value;
   continuing heating of the end face if the actual radius value is lower than the predetermined radius value; and
   discontinuing the heating of the end face if the actual radius value is equal to or higher than the predetermined radius value.

2. The method according to claim 1, comprising the initial steps of:
   applying heating and a pulling force simultaneously to a part of the optical fiber;
   breaking the optical fiber into two parts by means of the heating and pulling force; and
   continuing heating of the end face of one of the fiber parts.

3. The method according to claim 1, wherein the step of calculating the actual radius value of the end face comprises the steps of:
   visually locating a number of points on the surface of the end face of the optical fiber;
   creating an imaginary circle with a circumference passing through the points using a best fit calculation method;
   calculating the radius value of the imaginary circle; and
   using the calculated radius value as the actual radius value.

4. The method according to claim 2, wherein the step of calculating the actual radius value of the end face comprises the steps of:
   searching for two diametrically opposed edge points on the fiber end part that is continuously heated;
   calculating a center point between the two edge points; and
   searching for the position of the fiber end tip using the calculated position of the center point and camera registering.

5. An arrangement for shaping an end face of an optical fiber, using a control computer, comprising:
   means for heating the end face to form a substantially hemispherical end face having a predetermined radius value;
   means for repetitively calculating an actual radius value of the end face;
   means for comparing the actual radius value with the predetermined radius value;
   means for continuing heating of the end face if the actual radius value is lower than the predetermined radius value; and
   means for discontinuing the heating of the end face if the actual radius value is equal to or higher than the predetermined radius value.

6. The arrangement according to claim 5, wherein:
   a first and a second gripping device are arranged to grab and fix the optical fiber;
   a heat source is arranged to produce heat energy between the first and second gripping device;
   one gripping device is arranged to be moved from the other gripping device and apply a pulling force to the optical fiber for breaking the optical fiber into two parts with end faces; and
   the heat source comprises the means for heating one of the end faces.

7. The arrangement according to claim 5, wherein the means for calculating the actual radius value of the end face comprises:
   means for visually locating a number of points on the surface of the end face of the optical fiber;
   means for creating an imaginary circle with a circumference passing through the points using a best fit calculation method;
   means for calculating the radius value of the imaginary circle; and
   means for setting the actual radius value equal to the calculated radius value.

8. The arrangement according to claim 7, wherein the heat source comprises a plasma generator or a laser and wherein the means for visually locating a number of points on the surface of the end face comprises a Charged Coupled Device camera (CCD-camera) or a C-MOS camera.

9. A computer program for use in an end face shaping arrangement for optical fibers which, in order to form a substantially hemispherical end face having a predetermined radius value, comprises:
   computer readable code means, which when run on a computer, causes the end face shaping arrangement to heat the end face;
   computer readable code means, which when run on a computer, causes the end face shaping arrangement to repetitively calculate an actual radius value of the end face;

computer readable code means, which when run on a computer, causes the end face shaping arrangement to compare the actual radius value with the predetermined radius value;

computer readable code means, which when run on a computer, causes the end face shaping arrangement to continue heating of the end face if the actual radius value is lower than the predetermined radius value; and computer readable code means, which when run on a computer, causes the end face shaping arrangement to discontinue the heating of the end face if the actual radius value is equal to or higher than the predetermined radius value.

10. A computer program product comprising:

a computer readable medium; and a computer program according to claim 9;

said computer program being recorded on said computer readable medium.

11. The computer program product according to claim 10, wherein said computer readable medium comprises a memory chip or a diskette.

* * * * *